United States Patent [19]

Giaccari et al.

[11] Patent Number: 4,616,228
[45] Date of Patent: Oct. 7, 1986

[54] SYSTEM FOR SUPPRESSING UNWANTED LONG-RANGE AND/OR SECOND-TIME-AROUND RADAR ECHOES

[75] Inventors: Ennio Giaccari; Gaspare Galati, both of Rome, Italy

[73] Assignee: Selenia Industrie Elettroniche Associate S.p.A., Rome, Italy

[21] Appl. No.: 542,773

[22] Filed: Oct. 17, 1983

[30] Foreign Application Priority Data

Oct. 15, 1982 [IT] Italy ................................ 49272 A/82

[51] Int. Cl.$^4$ .......................... G01S 13/52; G01S 7/28
[52] U.S. Cl. ..................................... 342/160; 342/194
[58] Field of Search ..................... 343/7.7, 7 A, 17.1 R

[56] References Cited

U.S. PATENT DOCUMENTS

| 4,021,804 | 5/1977 | Dounce et al. | 343/7.7 X |
| 4,119,962 | 10/1978 | Lewis | 343/7.7 |
| 4,214,242 | 7/1980 | Colin | 343/7.7 |
| 4,217,584 | 8/1980 | Lombardi et al. | 343/7 A |

Primary Examiner—T. H. Tubbesing
Assistant Examiner—Mark Hellner
Attorney, Agent, or Firm—Karl F. Ross; Herbert Dubno

[57] ABSTRACT

A receiving section of a surveillance radar equipped with a power oscillator in its transmitting section comprises several registers for the storage of values, preferably in complex digital form, representing the starting phase of a continuous wave at the instant of transmission of an outgoing pulse, these values being used thereafter to establish coherence with an incoming echo pulse at a time when the power oscillator is no longer able to do so on account of unavoidable frequency drifts or because of intervention of a new recurrence period. Thus, the stored values permit the correct detection of targets at the far end of the range and/or the cancellation of second-time-around clutter echoes. The continuous wave may be generated by a coherent oscillator, phase-locked during each recurrence period by the outgoing pulse, or a separate crystal-controlled oscillator of highly stable frequency.

9 Claims, 1 Drawing Figure

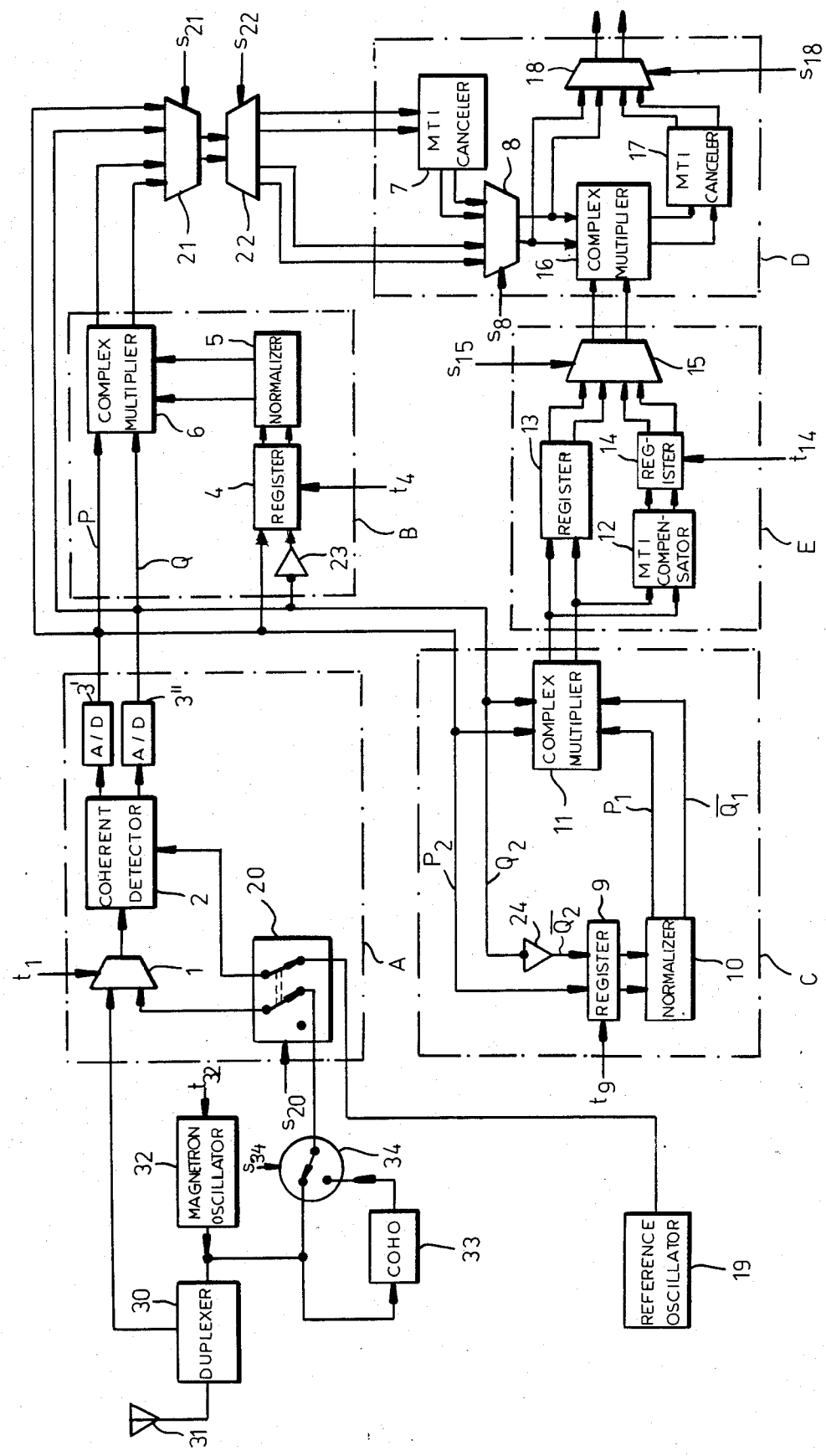

SYSTEM FOR SUPPRESSING UNWANTED LONG-RANGE AND/OR SECOND-TIME-AROUND RADAR ECHOES

FIELD OF THE INVENTION

Our present invention relates to a system for suppressing, in a pulse-type radar, unwanted echoes—such as those reflected by stationary clutter—whose identification as such involves problems of phase correlation between these echoes and the corresponding outgoing pulses.

BACKGROUND OF THE INVENTION

As is well known in the art, the relative radial velocity of a target reflecting a radar pulse can be determined from differences in the phase shifts occurring in successive sweeps between the outgoing pulse and the incoming echo. The term "sweep" is meant to denote the time required by an outgoing pulse to reach the reflecting object and to return as an echo; within the so-called unambiguous range, this time does not exceed the recurrence period of the outgoing pulses.

In many instances the echoes to be suppressed are those generated by ground clutter which, in the case of a stationary radar, has a relative radial velocity and thus a Doppler frequency equal to zero. A variety of cancelers, referred to as moving-target indicators (MTI), are known in the art to eliminate such echoes, e.g. as described in the book titled "Introduction to Radar Systems" by Merrill I. Sholnik, Second Edition, published 1980 by McGraw-Hill Book Company and referred to hereinafter as Sholnik. In the simplest case, such a canceler includes a delay circuit introducing a lag equal to one recurrence period, the input and the output of that circuit being connected to respective inputs of a comparator generating an output signal only if the two input voltages differ from each other. It is also known to erase echoes from targets having relative speeds other than zero, as by the matching-weight technique described in commonly owned U.S. Pat. No. 4,217,584.

Since the determination of the relative phase shift between the outgoing pulse and the incoming echo requires the availability of information on the phase of the outgoing pulse upon the arrival of its echo, it is necessary to provide a continuous wave (CW) of stable frequency for this purpose. In a simple CW radar described by Skolnik, a stabilized oscillator energizes a transmitting antenna through a power amplifier which is controlled by a periodically operating pulse modulator. The same oscillator furnishes a reference signal to a receiver detecting the Doppler-frequency phase shift of the returning echoes. A typical power amplifier for a radar transmitter is a klystron whose structure, however, is considerably heavier, more complex and more expensive than that of a power oscillator such as a magnetron which is periodically triggerable to emit the outgoing pulses.

With such a power oscillator, as described on page 106 of Skolnik, it is necessary to utilize a coherent oscillator (COHO) which is locked in step with the oscillator at the beginning of each recurrence period. Owing to that periodic resynchronization, however, the COHO cannot be relied upon for phase-shift determination in the case of a sweep exceeding the recurrence period, i.e. with so-called second-time-around echoes. The phenomenon of such echoes generated by ground clutter is discussed in a book titled "Propagation of Short Radio Waves" by D. E. Kerr, published 1951 by McGraw-Hill Book Company.

Moreover, since the COHO must be changeable as to phase by a locking pulse during a brief interval on the order of, say, one microsecond, it cannot be tuned by a high-Q tank circuit so that its operating frequency may drift instead of remaining sufficiently stable to allow for a reliable distinction between clutter and moving targets located close to the far end of a large unambiguous range.

The erasure of second-time-around echoes from reflectors having unwanted relative velocities, such as stationary clutter, is also not feasible by conventional means when the pulse frequency or phase is deliberately varied from time to time in order to suppress certain blind speeds, as likewise discussed by Skolnik.

OBJECTS OF THE INVENTION

The general object of our present invention, therefore, is to provide a system for so operating the receiving branch of a pulse-type radar—especially one equipped with a triggerable power oscillator—as to enable the reliable identification and cancellation of second-time-around echoes and/or echoes from unwanted reflectors at the far end of the range.

A more particular object is to provide a system of this character selectively switchable, e.g. upon changing environmental conditions, between detection of far-end and second-time-around echoes.

SUMMARY OF THE INVENTION

In accordance with our present invention, a radar with a transmitting section including periodically triggered pulse-generating means and a receiving section including a signal path with cancellation means for the suppression of incoming echoes from reflectors having unwanted relative velocities, e.g. zero, comprises a source of continuous wave maintaining coherence at least for the duration of a recurrence period, a coherent detector at an input end of the signal path controlled by that CW, storage means connected to the signal path at the beginning of a recurrence period for preserving a reference value representative of an initial phase of the CW, and corrective means in the signal path upstream of the cancellation means for correlating the phase of an incoming echo pulse with the initial phase of the CW under the control of the storage means.

Advantageously, and in a manner generally similar to that disclosed in the aforementioned prior U.S. Pat. No. 4,217,584, the signal path in the receiving section of the radar includes both an in-phase channel and a quadrature channel having respective branches connected to the storage means; the branch of the quadrature channel contains an inverter to replace the corresponding component in the output signal of the coherent detector by its conjugate. The in-phase component and the inverted quadrature component then jointly define a complex number constituting the reference valve representative of the initial CW phase. A complex multiplier forming part of the corrective means receives the stored components and the original components to correlate the phase of the detected signal with that of the CW. We prefer to digitize these components upstream of the corrective means, in which case the storage means can be simply a digital register.

The source of continuous wave controlling the coherent detector and furnishing the stored reference value could be a separate oscillator of high frequency stability, preferably of the crystal-controlled type, or a COHO periodically resynchronized by a locking pulse as discussed above, depending upon the desired mode of operation. The use of a frequency-stabilized oscillator as the source enables the reliable identification (and thus, if desired, elimination) of echoes from targets at the remote end of the range; the reference value representing the initial phase is established by the heterodyning of a signal cophasal with the outgoing pulse—which may directly delivered by the power oscillator generating same—with the stabilized CW in the coherent detector whereby the phase coherence with the subsequently received echo pulse—heterodyned in like manner with the same CW—is preserved. In principle, the reference value obtained from a given outgoing pulse could be stored for more than one recurrence period to facilitate the proper detection of multiple-time-around echoes; a simpler solution for second-time-around echoes, however, utilizes a periodically resynchronized COHO together with arithmetic means connected across a delay circuit for determining the phase shift undergone by the COHO from one recurrence period to the next and extracting therefrom—essentially in the manner described in the prior U.S. patent—a phasor serving as the reference value to be delivered to the storage means for correcting the phasing of signals in the detector output possibly due to second-time-around clutter echoes. When both one-period and two-period clutter echoes are to be suppressed, a conventional MTI canceler can be inserted upstream of the complex multiplier forming part of the corrective means and the stored reference value may be modified by an MTI-type compensator to take the operation of this canceler into account. Since ground clutter generally has a narrower bandwidth than clutter of the meterological kind, the canceler and the compensator may be of the simple two-pulse or three-pulse type.

BRIEF DESCRIPTION OF THE DRAWING

The above and other features of our invention will now be described in detail with reference to the accompanying drawing the sole FIGURE of which is a block diagram of a receiving section and part of a transmitting section of a radar embodying the present invention.

SPECIFIC DESCRIPTION

As shown in the drawing, an antenna 31 of a surveillance radar is connected to a duplexer 30 which receives outgoing pulses from a magnetron oscillator 32 forming part of a transmitting section and delivers incoming echoes to a receiving section including subassemblies A–E. Associated with these subassemblies are a reference oscillator 19 which is preferably of the crystal-stabilized kind, a COHO 33 of the usual pulse-locked type, and a switch 34 selectively settable to connect either the output of magnetron 32 or that of COHO 33 to one bank contact of a double-pole switch 20 in subassembly A having another bank contact tied to the output of stabilized oscillator 19.

Subassembly A further includes a multiplexer 1 having one input tied to the output of duplexer 30 and having another input connected to one of the poles of switch 20; the output of multiplexer 1 is connected to one input of a coherent detector 2 which has a second input tied to the other pole of switch 20. Detector 2, with the aid of a heterodyning signal received via switch 20 from oscillator 19 or 33, generates an in-phase component and a quadrature component of an echo signal respectively fed to two analog/digital converters 3' and 3" emitting these components in digitized form on two leads respectively designated P and Q.

Subassembly B comprises a complex multiplier 6 with two pairs of inputs; the first pair receives the vector of the echo signal directly from in-phase and quadrature channels P and Q while the second pair receives its conjugate by way of a digital register 4 and a normalizer 5, with interposition of an inverter 23 between lead Q and register 4. Normalizer 5 is a coherent limiter referring the conjugate of the echo signal to a unit value as described in prior U.S. Pat. No. 4,217,584.

Subassembly C includes a register 9, a normalizer 10, a complex multiplier and an inverter 24 similar to elements 4, 5, 6 and 23 of subassembly B. Register 9 receives the in-phase and quadrature components from converters 3' and 3" via branches $P_2$ and $Q_2$ of channels P and Q, with interposition of inverter 24 between converter 3" and register 9 to which the output of the inverter is connected via an extension $\bar{Q}_2$ of branch lead $Q_2$. This register stores the conjugate of the echo signal for one recurrence period before delivering it by way of normalizer 10 to multiplier 11 on leads $P_1$ and $Q_1$. The other pair of inputs of multiplier 11 are tied to branch channels $P_2$ and $Q_2$ whereby this multiplier simultaneously receives the vector of an incoming echo and the conjugate of the vector of an echo detected one recurrence period earlier. Thus, as described in the prior U.S. patent, multiplier 11 acts as an arithmetic unit generating a complex number which represents the phase shift existing between these two consecutive echoes; such a phase shift is due in part to the usually unavoidable phase difference between the successively emitted magnetron pulses and in part to the relative radial velocity, if any, of the reflecting target.

A multiplexer 21 has two pairs of input terminals, one of them being connected to the outputs of multiplier 6 while the other pair are tied directly to leads P and Q. The single pair of output terminals of this multiplexer are connected to a pair of input terminals of a demultiplexer 22 having two pairs of output terminals respectively connected to an MTI conceler 7 and to a pair of input terminals of a multiplexer 8 in subassembly D. Canceler 7, which may be of the simple two-pulse or three-pulse type referred to above, works into another pair of input terminals of multiplexer 8 whose two output terminals are connected on the one hand to inputs of a complex multiplier 16 and on the other hand to a first pair of input terminals of a multiplexer 18. Multiplier 16 works into another MTI canceler 17 with outputs tied to a second pair of input terminals of multiplexer 18 whose own outputs lead to a nonillustrated evaluation unit such as a visualizer or a decision stage.

Subassembly E includes a digital register 13 which is connected, in parallel with an MTI compensator 12, to the outputs of multiplier 11 in subassembly C. Compensator 12, whose structure should be similar to that of canceler 7 for reasons that will become apparent, feeds a digital register 14; a multiplexer 15 has two pairs of output terminals, respectively connected to ouputs of registers 13 and 14, and a pair of output terminals connected to additional inputs of multiplier 16 in subassembly D.

Elements 1, 4, 9 and 14 are controlled by a nonillustrated timer with the aid of respective pulses $t_1$, $t_4$, $t_9$ and $t_{14}$; magnetron 32 is periodically triggered by timing pulses $t_{32}$. Elements 8, 15, 18, 20, 21, 22 and 34 are switchable, manually or otherwise, by respective selection signals $s_1$, $s_8$, $s_{15}$, $s_{20}$, $s_{21}$, $s_{22}$ and $s_{34}$; some of these switching signals can be generated by an independently prepared "clutter map", as described by Sholnik, in accordance with environmental conditions.

Components A-E, whose operation will be described hereinafter, may be respectively termed a phase comparator, a far-end phase corrector, a second-time-around phase corrector, a cancellation unit and an ancillary phase corrector.

OPERATION

In a conventional mode of operation of the system shown in the drawing, switches 20 and 34 are in their alternate positions in which COHO 33 feeds the coherent detector 2; multiplexer 21, demultiplexer 22 and multiplexers 8, 18 are positioned to bypass the subassembly B and to deliver the digitized echo signals from channels P and Q via canceler 7 to the output of subassembly D. This mode of operation will suppress echoes from relatively stationary reflectors located at a distance short enough to let these echoes be detected at a time when the frequency drift of COHO 33 is still insignificant.

I. Far-end phase correction

This mode of operation pertains to the suppression of echoes from clutter located near the remote end of the range, i.e. at a distance corresponding to a sweep for which the frequency of COHO 33 is no longer sufficiently stable. Switches 20 and 34 are now placed, by means of signals $s_{20}$ and $s_{34}$, in their illustrated positions whereby wave energy from magnetron oscillator 32, generated at the beginning of a recurrence period, reaches the signal input of detector 2 by way of multiplexer 1 while a continuous reference wave from oscillator 19 is fed to the heterodyning input of that detector. The conjugate vector of the resulting output pulse, digitized in converters 3' and 3", is stored for the remainder of the recurrence period in register 4 under the control of timing pulse $t_4$; complex multiplier 6, connected by multiplexer 21 and demultiplexer 22 to MTI canceler 7, has no output at that instant since the product of the signal vector and its conjugate is zero.

With multiplexer 1 switched over by timing pulse $t_1$ after the emission of the outgoing radar pulse, incoming echoes from duplexer 30 are fed via detector 2 and converters 3', 3" to multiplier 6 which also receives from normalizer 5 the reference value stored in register 4; the contents of that register are kept unchanged by pulse $t_4$ to the end of the instant recurrence period. Thus, multiplier 6 delivers to canceler 7 a signal representative of the phase shift between the outgoing pulse and its intercepted echo which, in the well-known manner, is compared in canceler 7 with the signal received one recurrence period earlier from multiplier 6. When the two signals are identical, indicating the stationary character of the reflecting object, canceler 7 has no output. Otherwise a difference signal—still in complex form—is fed by canceler 7 via multiplexers 8 and 18 to the associated load.

It will be noted that, in this mode of operation, multiplexer 18 cuts off the subassemblies C and E from the load so that they are practically inactive; they could also be deactivated manually or by specific control signals.

II. Second-time-around phase correction

With this mode of operation, switches 20 and 34 as well as multiplexer 21 are in the same positions as with the aforedescribed conventional mode. Thus, oscillator 19 is disconnected and COHO 33 works into detector 2. Subassembly B is inoperative and, if desired, may be deactivated manually or by a specific control signal. Multiplexer 18 of subassembly D is switched to MTI canceler 17 whereas the positions of demultiplexer 22 and multiplexers 8 and 15 depend on which of two possible variants of this mode—discussed below—is selected.

IIa. Suppression of two-period clutter echoes only

Demultiplexer 22 connects multiplexer 21 to multiplexer 8 while multiplexer 15 connects register 13 to complex multiplier 16.

At the beginning of each recurrence period, under the control of pulse $t_9$, register 9 stores for one such period the conjugate of the signal vector then emitted by detector 2 via converters 3' and 3". At the beginning of the next recurrence period, therefore, multiplier 11 calculates the phase difference between the outgoing pulses as duplicated by the resynchronization of COHO 33. The corresponding phasor, stored in register 13, is then multiplied in unit 16 with the vector of a detected echo pulse arriving at that unit from in-phase and quadrature channels P and Q by way of switching elements 21, 22 and 8. If that echo signal is due to second-time-around clutter, its replica received two recurrence periods later will be modified by multiplier 16 on the basis of the new contents of register 13 to take the intervening phase shift of COHO 33 into account. MTI canceler 17, which is preferably similar to canceler 7, will then suppress such a clutter echo but will pass on any other echo signal to multiplexer 18 and thus to the associated evaluation stage.

IIb. Suppression of one-period and two-period clutter echoes

This variant differs from the one just described in that demultiplexer 22 and multiplexers 8 and 15 are in their alternate positions. The phasor emitted by multiplexer 11 of subassembly C is differentially combined in compensator 12 with the phasor calculated one recurrence period earlier, the result being stored in register 14 under the control of pulse $t_{14}$ so as to be available to multiplier 16 in subassembly D upon the arrival of an echo signal. Such an echo signal, however, has already been screened by canceler 7 which has eliminated the one-period vectors and has modified all others in a manner analogous to that of compensator 12 whereby second-time-around signals maintain their mutual identity and are suppressed by canceler 17. All other echo signals, again, pass through multiplexer 18 to the load.

III. Universal clutter-echo suppression

This mode of operation, representing a combination of modes I and II, differs from the one described for mode IIb in that multiplexer 21 is in the same position as with mode I so that coherence between outgoing pulses and incoming echoes is maintained with the aid of oscillator 19 instead of COHO 33.

It will be apparent that a radar receiver designed to implement only one of the two basic modes can be simplified with omission of subassembly B or subassemblies C, E.

We claim:

1. In a pulse-type radar provided with a transmitting section and a receiving section, said transmitting section including pulse-generating means periodically triggered to emit outgoing pulses with a recurrence period establishing a predetermined unambiguous range, said receiving section including a signal path said signal path having an in phase and quadrature channel, for incoming echo pulses and a first cancellation means in said signal path for the suppression of second-time-around echoes from reflectors having unwanted relative velocities, the combination therewith of a source of continuous wave maintaining coherence at least for the duration of a recurrence period, coherent detector means at an input end of said signal path controlled by said continuous wave, storage means being connected by a first branch to said in phase channel and by a second branch to said quadrature channel, said second branch containing an inverter, at the beginning of a recurrence period for preserving a reference value representative of an initial phase of said continuous wave, and corrective means connected to said signal path upstream of said cancellation means controlled by said storage means for correlating the phase of an incoming echo pulse with said initial phase, said corrective means comprising a first complex multiplier with a first pair of inputs connected to in-phase and quadrature outputs of said storage means and with a second pair of inputs connected to said in-phase and quadrature channels, an analog/digital converter inserted in each of said channels upstream of said corrective means, and said corrective means further includes register means introducing a delay of one recurrence period in said branches and a second complex multiplier connected across said register means for delivering to said cancellation means a reference value based upon the initial phases of said continuous wave at the beginning of two consecutive recurrence periods.

2. The combination defined in claim 1, further comprising a normalizer inserted between said storage means and said complex multiplier.

3. The combination defined in claim 1, further comprising second cancellation means insertable between said second complex multiplier and said register means for determining differences between successive reference values an supplying only said differences to said storage means and a third cancellation means connected upstream of said second complex multiplier in said signal path.

4. The combination defined in claim 1 wherein said storage means comprises a digital register.

5. The combination defined in claim 1 wherein said source comprises a coherent oscillator with a phase-locking loop resynchronizable at the beginning of each recurrence period with said pulse-generating means.

6. The combination defined in claim 5 wherein said pulse-generating means comprises a power oscillator.

7. The combination defined in claim 6 wherein said power oscillator is a magnetron.

8. The combination defined in claim 5 wherein said source further comprises a frequency-stabilized oscillator and switchover means for selectively connecting either of said oscillators to said coherent detector means.

9. The combination defined in claim 1 wherein said source comprises a crystal-stabilized oscillator.

* * * * *